United States Patent
Devaraj et al.

(10) Patent No.: US 11,765,128 B2
(45) Date of Patent: Sep. 19, 2023

(54) DHCP SERVER IP ADDRESS ALLOCATION IMPROVEMENT TO NULLIFY THE IMPACT OF MAC RANDOMIZATION

(71) Applicant: ARRIS Enterprises LLC, Suwanee, GA (US)

(72) Inventors: Dileep Devaraj, Bangalore (IN); Balaji Vinayagam, Chennai (IN)

(73) Assignee: ARRIS ENTERPRISES LLC, Suwanee, GA (US)

( * ) Notice: Subject to any disclaimer, the term of this patent is extended or adjusted under 35 U.S.C. 154(b) by 0 days.

(21) Appl. No.: 17/988,280

(22) Filed: Nov. 16, 2022

(65) Prior Publication Data

US 2023/0179567 A1 Jun. 8, 2023

Related U.S. Application Data

(60) Provisional application No. 63/286,679, filed on Dec. 7, 2021.

(51) Int. Cl.
| | |
|---|---|
| *G06F 15/16* | (2006.01) |
| *G06F 9/54* | (2006.01) |
| *H04L 29/06* | (2006.01) |
| *H04L 61/5014* | (2022.01) |
| *H04L 61/5092* | (2022.01) |
| *H04L 61/2596* | (2022.01) |

(52) U.S. Cl.
CPC ...... *H04L 61/5014* (2022.05); *H04L 61/2596* (2013.01); *H04L 61/5092* (2022.05)

(58) Field of Classification Search
CPC ............. H04L 61/5014; H04L 61/5092; H04L 61/2596

USPC .......................................................... 709/245
See application file for complete search history.

(56) References Cited

U.S. PATENT DOCUMENTS

| | | | | |
|---|---|---|---|---|
| 6,212,563 B1 * | 4/2001 | Beser | ............... | H04N 21/42684 709/227 |
| 7,099,338 B1 * | 8/2006 | Lee | .......................... | H04L 61/00 709/223 |

(Continued)

OTHER PUBLICATIONS

International Search Report and the Written Opinion of the International Searching Authority dated Jan. 17, 2023 in International (PCT) Application No. PCT/US2022/050082.

*Primary Examiner* — Hamza N Algibhah
(74) *Attorney, Agent, or Firm* — Wenderoth, Lind & Ponack, L.L.P.

(57) ABSTRACT

A Dynamic Host Configuration Protocol (DHCP) server includes a memory storing computer-readable instructions, and a processor configured to execute the computer-readable instructions to determine a media access control (MAC) address associated with a client, determine the MAC address associated with the client is a randomized MAC address, and assign an IP address the client from a DHCP IP server pool. The processor assigns an IP address to the client from a DHCP IP server pool using one of identifying, in a DHCP server table, at least one host name of the client and assigning a previously assigned IP address to the at least one host name of the client, and when the host name of the client is not available, assigning the IP address using a first lease with a first duration shorter than a default lease duration used for non-randomized MAC addresses.

20 Claims, 12 Drawing Sheets

(56) References Cited

U.S. PATENT DOCUMENTS

| | | | | |
|---|---|---|---|---|
| 7,757,000 | B1* | 7/2010 | Kinnear, Jr. | H04L 61/5014 709/230 |
| 8,856,360 | B2* | 10/2014 | Achan | H04L 63/1408 709/227 |
| 10,771,438 | B2* | 9/2020 | Zuniga | H04W 12/08 |
| 11,483,283 | B1* | 10/2022 | Choukir | H04W 8/005 |
| 2004/0249906 | A1* | 12/2004 | Olbricht | H04L 61/50 709/220 |
| 2008/0320115 | A1* | 12/2008 | Ding | H04L 69/167 709/220 |
| 2011/0055362 | A1* | 3/2011 | Perez | H04L 63/02 709/221 |
| 2012/0089713 | A1* | 4/2012 | Carriere | H04L 61/5014 709/222 |
| 2012/0173646 | A1* | 7/2012 | Lan | H04L 61/5014 709/224 |
| 2012/0198091 | A1* | 8/2012 | Kanada | H04L 12/4641 709/238 |
| 2015/0281172 | A1* | 10/2015 | He | H04L 41/12 709/222 |
| 2016/0099912 | A1* | 4/2016 | Wells | H04L 61/5053 709/226 |
| 2017/0163597 | A1* | 6/2017 | Amerneni | H04L 61/5014 |
| 2018/0287938 | A1* | 10/2018 | Han | H04L 12/4633 |
| 2020/0344203 | A1* | 10/2020 | Mermoud | H04L 61/5014 |
| 2021/0168115 | A1* | 6/2021 | de la Oliva | H04L 61/4541 |
| 2021/0258774 | A1* | 8/2021 | Ramsay, III | H04W 12/69 |

\* cited by examiner

| DHCP Server Lease Table | | | | |
|---|---|---|---|---|
| Host Name | IP Address | MAC Address | State | Expiration |
| 1st Host Name | 192.168.0.3 | e4:46:da:4f:2f:30 | Active | 00:14:36:42 |
| 2nd Host Name | 192.168.0.4 | 04:c8:07:2e:3a:52 | Active | 00:21:35:06 |
| 3rd Host Name | 192.168.0.5 | e4:a4:71:b6:90:bd | Active | 00:23:01:10 |
| 4th Host Name | 192.168.0.6 | dc:1b:a1:72:7e:b9 | Active | 00:22:36:45 |
| 5th Host Name | 192.168.0.7 | 34:f3:9a:56:e5:5f | Active | 00:23:36:35 |
| <none> | 192.168.0.10 | ec:0d:e4:e7:c1:c8 | Active | 00:20:32:19 |
| 7th Host Name | 192.168.0.16 | a0:78:17:97:38:b9 | Active | 00:21:14:38 |
| Total Entities: 7 | | | | |

Fig. 3

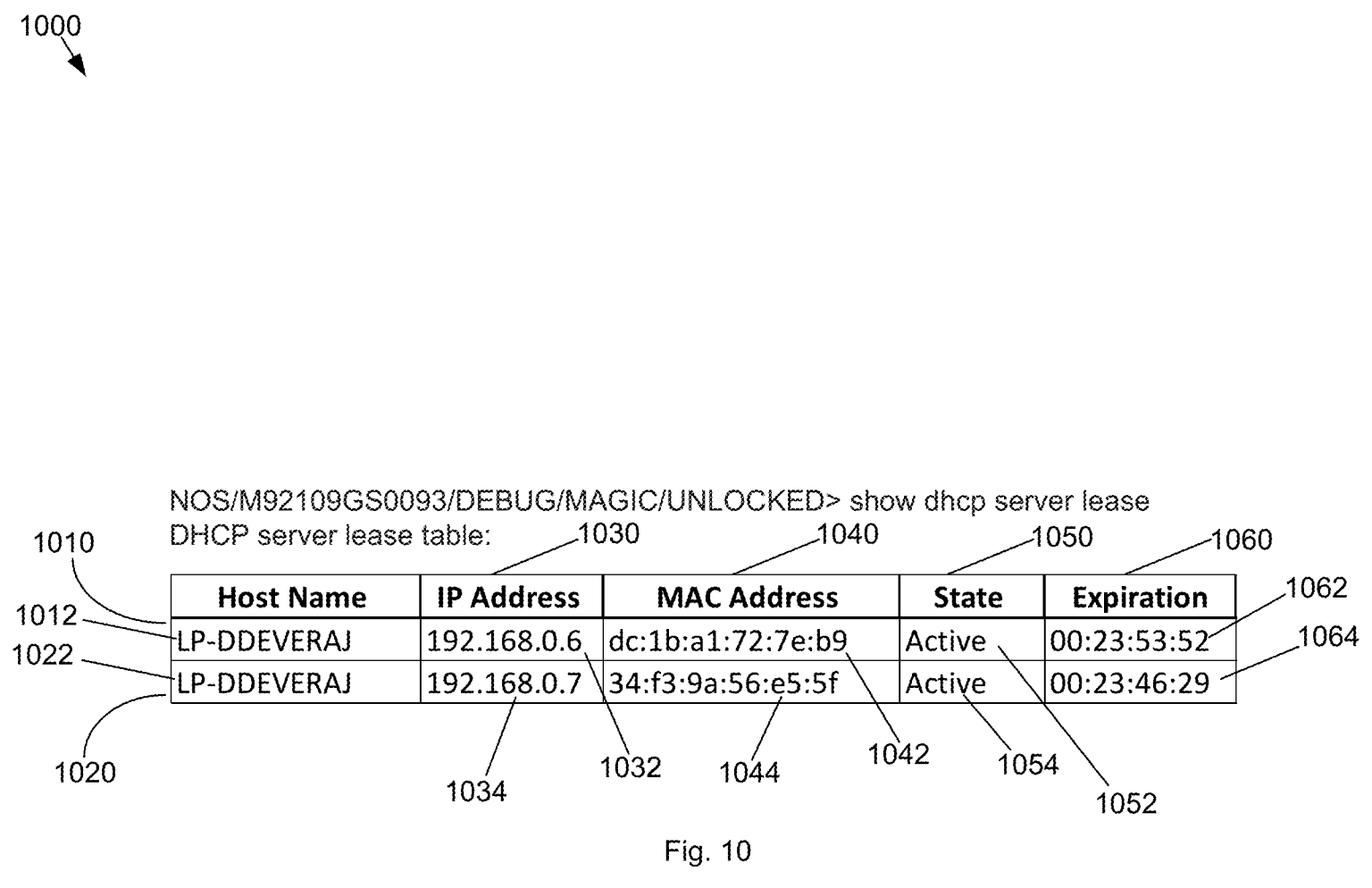

NOS/M92109GS0093/DEBUG/MAGIC/UNLOCKED> show dhcp server lease
DHCP server lease table:

| Host Name | IP Address | MAC Address | State | Expiration |
|---|---|---|---|---|
| LP-DDEVERAJ | 192.168.0.6 | dc:1b:a1:72:7e:b9 | Active | 00:23:53:52 |
| LP-DDEVERAJ | 192.168.0.7 | 34:f3:9a:56:e5:5f | Active | 00:23:46:29 |

Fig. 10

DHCP SERVER IP ADDRESS ALLOCATION IMPROVEMENT TO NULLIFY THE IMPACT OF MAC RANDOMIZATION

BACKGROUND

Internet Protocol (IP) defines how devices communicate within and across local networks on the Internet. Dynamic Host Configuration Protocol (DHCP) is a network management protocol used on Internet Protocol (IP) networks for automatically assigning IP addresses and other communication parameters to devices connected to the network using a client-server architecture. A DHCP server can manage IP settings for devices on its local network, for example, by assigning IP addresses to those devices automatically and dynamically. Thus, DHCP is commonly used to assign IP addresses to LAN clients like Workstations, Mobile phones, tablets etc. DHCP eliminates the need for individually configuring network devices manually, and consists of two network components, a centrally installed network DHCP server and client instances of the protocol stack on each computer or device.

The DHCP process begins with the client device sending a Discover Message that request for all DHCP servers available on the network to provide an address if they have one available. All DHCP servers on the network that have an available address respond with an Offer Message. The client device may receive multiple offers if multiple servers are on the network. The client chooses one offer and sends a Request Message back to the DHCP server. Because the client is not authorized to use the offered address yet, the DHCP Request is still a broadcast. The client accepts the first offer received unless another offer matches the last IP address that the client had. The DHCP server finalizes the process with an Acknowledgment Message, or ACK message, allowing the client device to start using the address.

DHCP IP address assignment is typically based on identifying the client's MAC address and assigning an IP from the DHCP Server pool. The DHCP server maintains a pool of IP addresses and leases an address to any DHCP-enabled client when it starts up on the network. Because the IP addresses are dynamic (leased) rather than static (permanently assigned), addresses no longer in use are automatically returned to the pool for reallocation. The DHCP server selects IP addresses and other parameters from the address pool and assigns them to the DHCP clients. However, MAC Randomization can be enabled on DHCP clients. There are options to configure it on a periodic basis, e.g., hourly, daily, weekly, etc. Each time the DHCP requests come from a new MAC address, a new IP Address gets assigned from the DHCP server pool and there is a high chance that the IP address pool gets exhausted when multiple clients having randomized MAC addresses are served by the same DHCP server. This may create confusion while debugging any network issues as well.

SUMMARY

An aspect of the present disclosure involves a system and method for improving the assignment of an IP address to a client when the client has a randomized MAC address.

A Dynamic Host Configuration Protocol (DHCP) server includes a memory storing computer-readable instructions, and a processor configured to execute the computer-readable instructions to determine a media access control (MAC) address associated with a client, determine the MAC address associated with the client is a randomized MAC address, and assign an IP address the client from a DHCP IP server pool using one of identifying, in a DHCP server table, at least one host name of the client and assigning a previously assigned IP address to the at least one host name of the client, and. when the host name of the client is not available, assigning the IP address using a first lease with a first duration shorter than a default lease duration used for non-randomized MAC addresses.

The processor identifies the at least one host name of the client by determining the at least one host name from a DHCP discover message with Option 12 specifying the at least one host name, and identifies the at least one host name in the DHCP server table based on the at least one host name specified by the DHCP discover message with Option 12, wherein the processor determines the MAC address the randomized MAC address by determining a second bit in the MAC address has a predetermine indicator for randomized MAC addresses, wherein the predetermined indicator for the randomized MAC addresses comprises one of a value of 2, 6, A, and E.

When the processor assigns the IP address using the first lease, the processor performs duplicate address detection (DAD) to ensure the IP address is not currently in use.

When the processor identifies the at least one host name of the client is in the DHCP server table and the previously assigned IP address is assigned to the at least one host name of the client, the processor determines whether duplicate host names are in the DHCP server table, the processor performing duplicate address detection (DAD) to ensure the previously assigned IP address is not currently in use when the processor determines there are no duplicate host names in the DHCP server table.

The processor selects from the DHCP server pool a first fixed IP address for the host name of the client when the processor determines there are duplicate host names in the DHCP server table, performs duplicate address detection (DAD) to determine whether the first fixed IP address is in use, and assigns the first fixed IP address to the host name when the processor determines from the duplicate address detection (DAD) that the first fixed IP address is not in use.

The processor selects from the DHCP server table a next fixed IP address having the same host name when the first fixed IP address is determined to be in use, and performs duplicate address detection (DAD) to determine whether the next fixed IP address having the same host name is in use, the processor assigning the next fixed IP address having the same host name to the client when the processor determines from the duplicate address detection (DAD) that the next fixed IP address having the same host name is not in use.

The processor selects from the DHCP server table a different fixed IP address from the DHCP server pool for the client associated with the host name when the next fixed IP address having the same host name is determined to be in use and performs duplicate address detection (DAD) to determine whether the different fixed IP address is currently in use, the processor assigning the different fixed IP address to the client associated with the host name when the processor determines from the duplicate address detection (DAD) that the different fixed IP address is not currently in use.

BRIEF SUMMARY OF THE DRAWINGS

The accompanying drawings, which are incorporated in and form a part of the specification, illustrate examples of the subject matter of the present disclosure and, together with the description, serve to explain the principles of the present disclosure. In the drawings:

FIG. 3 shows a DHCP Server Lease Table.

FIG. 10 shows a DHCP Server Lease Table having duplicate host names.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness.

An aspect of the present disclosure involves a system and method for improving the assignment of an IP address to a client when the client has a randomized MAC address.

Figure 1:
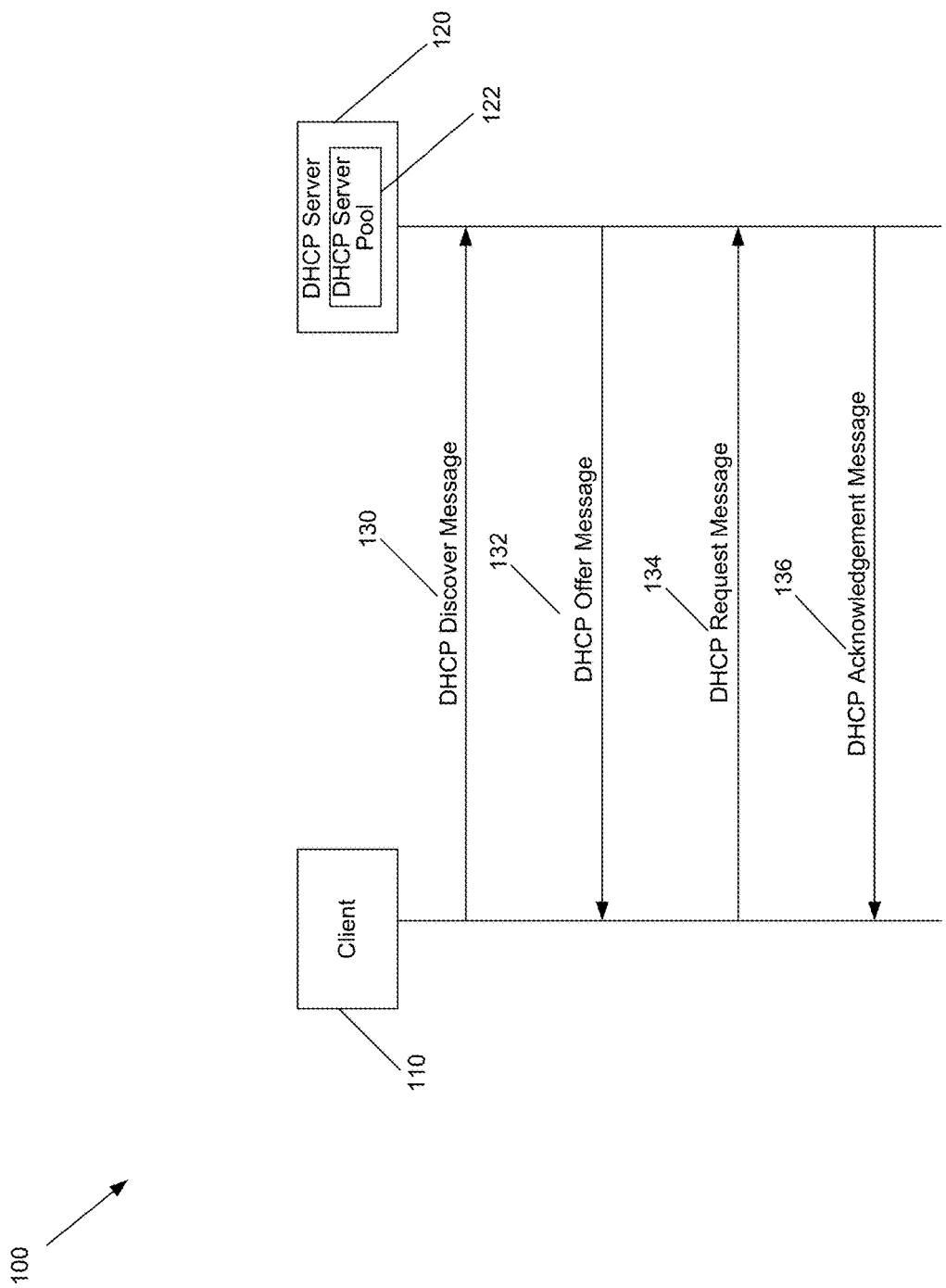
FIG. 1 shows a Dynamic Host Configuration Protocol (DHCP) process for assigning an IP address to a client.

FIG. 1 shows a Dynamic Host Configuration Protocol (DHCP) process 100 for assigning an IP address to a client.

In FIG. 1, a Client 110 communicates with a DHCP Server 120. The DHCP process begins when the Client 110 sends the DHCP Server 120 a DHCP Discover Message 130. The DHCP Discover Message requests all DHCP servers available on the network, including DHCP Server 120, to provide an IP address if they have one available in their DHCP Server IP Address Pool 122. When DHCP Server 120 has an available IP address in the DHCP Server Pool, DHCP Server 120 responds with a DHCP Offer Message 132 that is sent to Client 110. Client 110 may receive multiple offers if multiple servers are on the network. Client 110 chooses one offer and sends a DHCP Request Message 134 back to the DHCP Server 120. Because Client 110 is not authorized to use the offered address yet, the DHCP Request Message 134 is still a broadcast. Client 110 accepts the first offer received unless another offer matches the last IP address that Client 110 had. The DHCP Server 120 finalizes the DHCP process with an DHCP Acknowledgment Message 136 (DHCP ACK Message), allowing Client 110 to start using the IP address.

Figure 2:
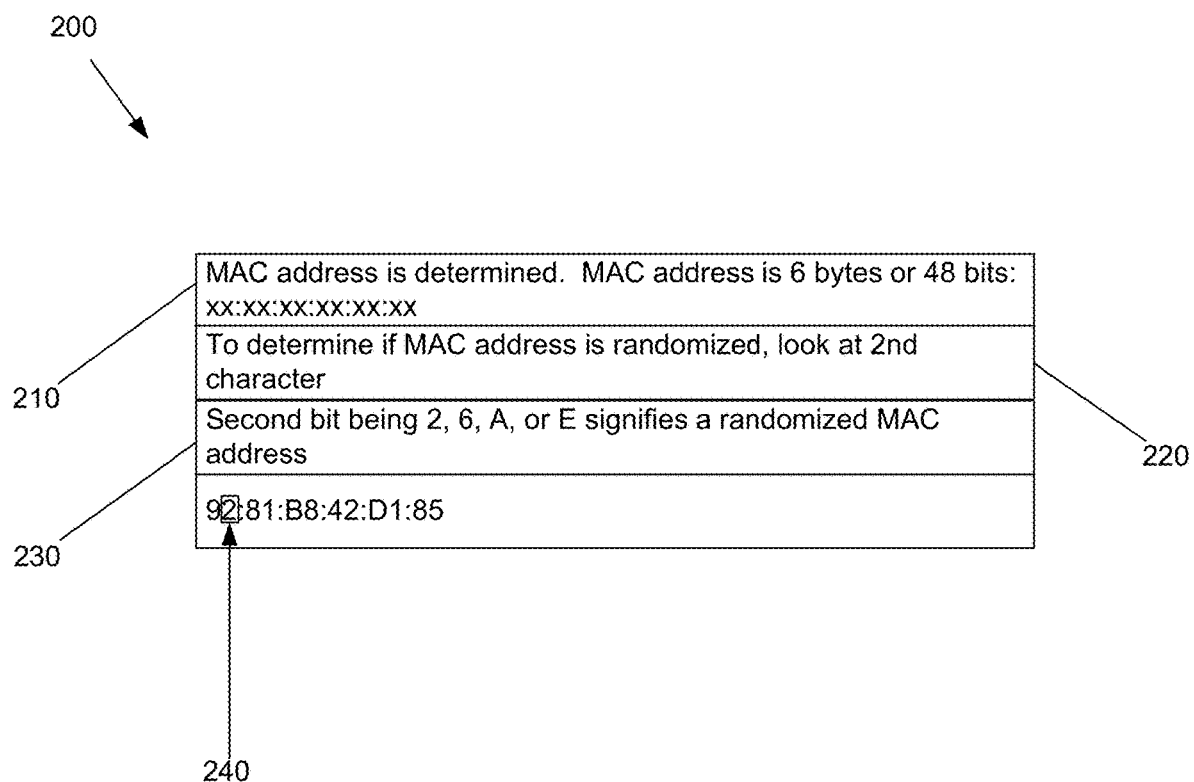
FIG. 2 illustrates a method of identifying a randomized MAC address.

FIG. 2 illustrates a method of identifying a randomized MAC address 200.

In FIG. 2, field 210 shows that the MAC address is determined. MAC address is 6 bytes or 48 bits, i.e., xx:xx:xx:xx:xx:xx. The second filed 220 shows that the network device analyzes the second character in the 48 bit MAC address to determine whether MAC address randomized. The third field 230 shows that the MAC address is determined to be randomized when the second bit has a value of 2, 6, A, or E. The fourth field 240 shows a MAC address where the second bit has a value of 2, which signifies that the MAC address is a randomized MAC address.

FIG. 3 shows a DHCP Server Lease Table 300.

In FIG. 3, the DHCP Server Lease Table 300 includes a Host Name 310, IP Address 320, MAC Address 330, State 340, and Expiration 350. The DHCP Server Lease Table 300 shows a 7$^{th}$ Host Name 312. The 7$^{th}$ Host Name 312 has an IOP Address of 192.168.0.16 322. The 7$^{th}$ Host Name 312 has a MAC Address of a0:78:17:97:38:b9 332. The 7$^{th}$ Host Name 312 has an Active state 342 and has an expiration of 00:21:14:38 352. The DHCP Server Lease Table 300 shows a total of 7 entities 360.

Figure 4:
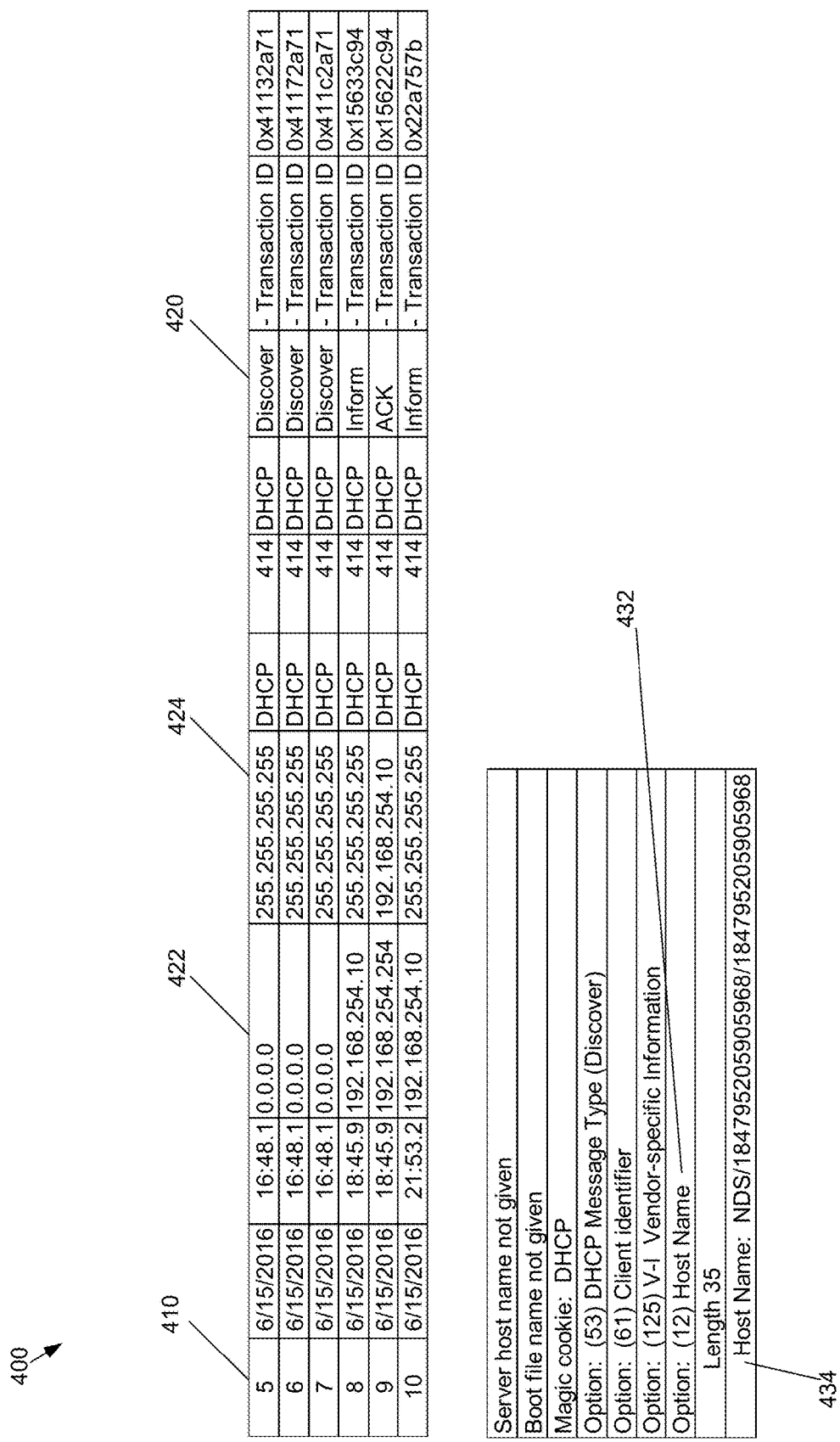
FIG. 4 shows operation of a DHCP Discover Message using DHCP Option 12.

FIG. 4 shows operation of a DHCP Discover Message using DHCP Option 12 400.

In FIG. 4, message 5 410 is a DHCP Discover Message 420. DHCP Discover Message 420 shows IP address 0.0.0.0 422 and broadcast address 255.255.255.255 424. DHCP Client Option 12 432 specifies the Host name of the client. While acquiring an IP address from the Dynamic Host Configuration Protocol (DHCP) server, Option 12 432 passes the Host name of the client device to the DHCP server to provide additional information about the client. As shown in FIG. 4, the Host Name 434 is shown as NDS/184795205905968.

Figure 5:
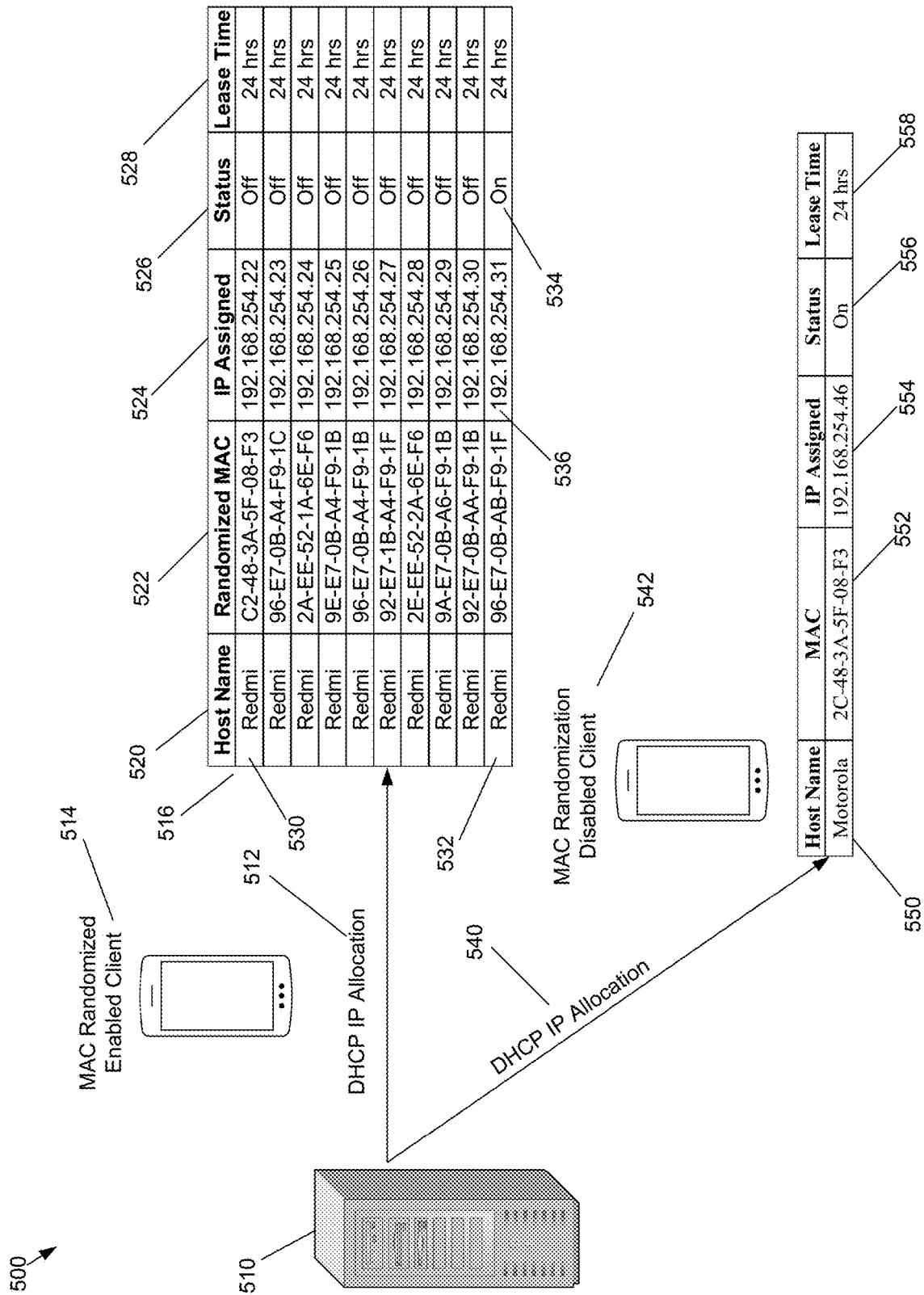
FIG. 5 shows typical IP address assignment.

FIG. 5 shows typical IP address assignment 500.

In FIG. 5, a DHCP server 510 is shown providing DHCP IP address allocation 512 for a MAC randomized enabled client 514 and DHCP IP address allocation 540 for a MAC randomized disabled client 542. An IP address table 516 shows Host Names 520, Randomized MAC addresses 522, IP address assignments 524, assignment status 526, and Lease Time 528.

IP address table 516 shows entries for a client device that has Host Name 520 of Redmi 530. IP address table 516 shows Randomized MAC addresses 522 for each entry in the IP address table 516. IP address table 516 shows different IP address assignments 524 for each entry. The Lease Time 528 for each entry is 24 hours and only the last entry 532 has an IP address status of ON 534 to reflect IP address 192.168.254.31 536 is assigned.

For the MAC Randomization Disabled Client 542, the Host Name is show as Motorola 550. The MAC address 552 is not randomized as demonstrated by the second bit not having a value of 2, 6, A, or E. An IP address of 192.168.254.46 554 is assigned to the Motorola host 550. The status 556 is ON and the Least Time 558 is 24 hours.

Figure 6:
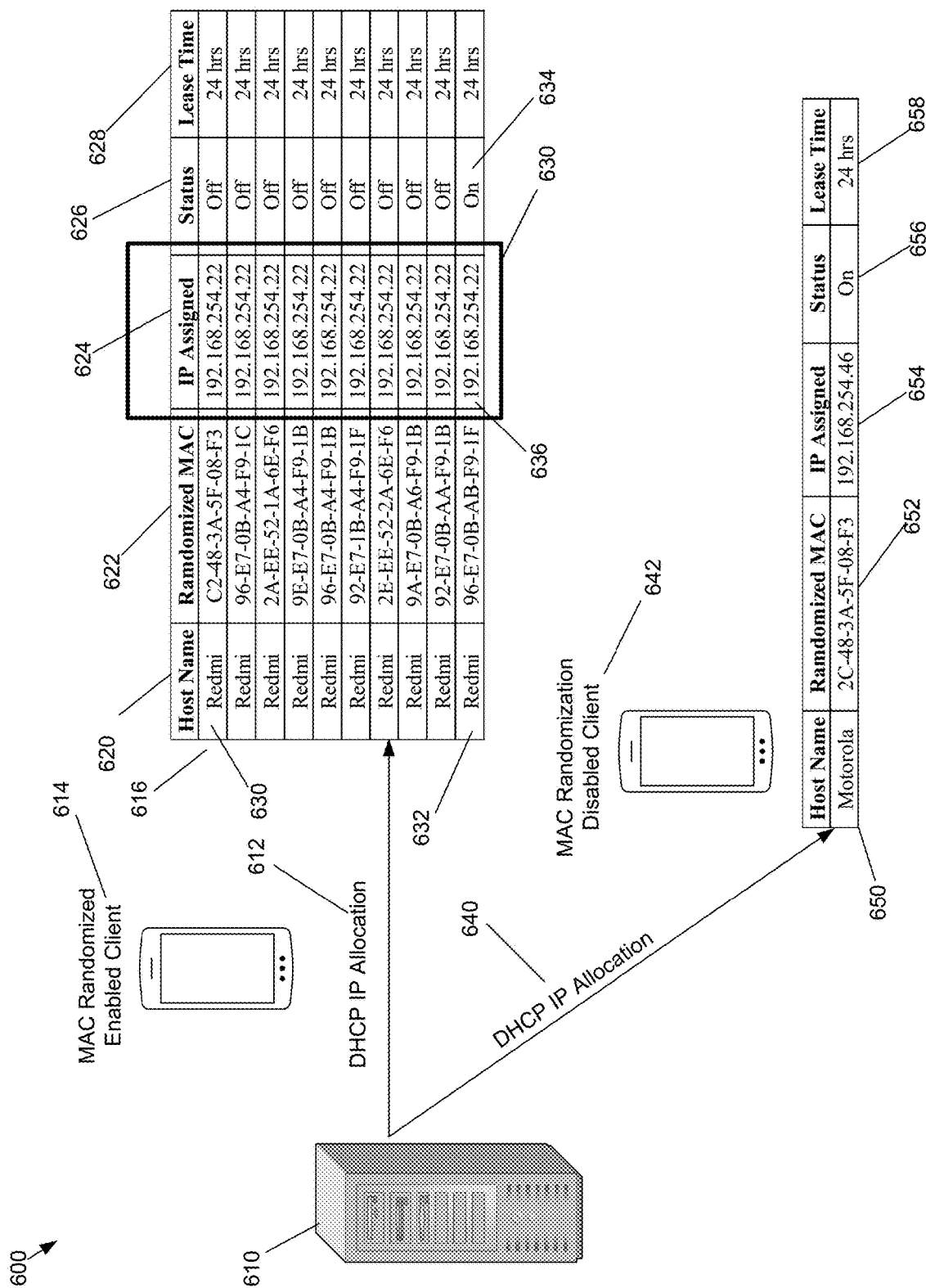
FIG. 6 shows a same IP address assignment.

FIG. 6 shows a same IP address assignment 600.

In FIG. 6, a DHCP server 610 provides DHCP IP address allocation 612 for a MAC randomized enabled client 614 and DHCP IP address allocation 640 for a MAC randomized disabled client 642. An IP address table 616 shows Host Names 620, Randomized MAC addresses 622, IP address assignments 624, assignment status 626, and Lease Time 628.

IP address table 616 shows entries for a client device that has Host Name 620 of Redmi 630. IP address table 616 shows Randomized MAC addresses 622 for each entry in the IP address table 616. However, unlike FIG. 5, the IP address table 616 shows duplicate IP address assignments 630 for each entry. The Lease Time 628 for each entry is 24 hours and only the last entry 632 has an IP address status of ON 634 to reflect IP address 192.168.254.31 636 is assigned.

The table for the MAC Randomization Disabled Client 542 is the same as shown with reference to FIG. 5. The Host Name is show as Motorola 650. The MAC address 652 is not randomized as demonstrated by the second bit not having a value of 2, 6, A, or E. An IP address of 192.168.254.46 654 is assigned to the Motorola host 650. The status 656 is ON and the Least Time 658 is 24 hours.

Figure 7:
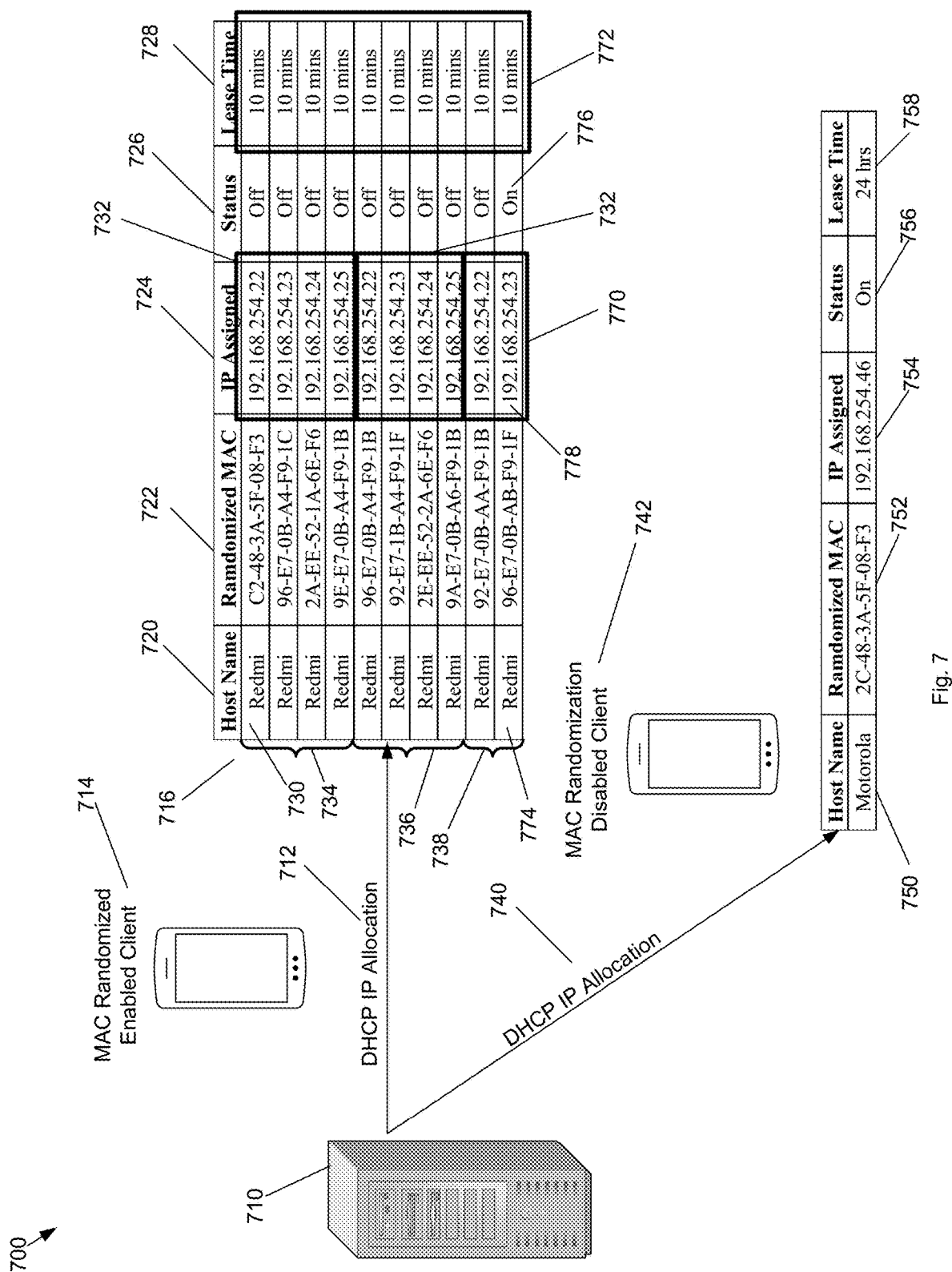
FIG. 7 shows a shorter lease time for randomized MAC clients.

FIG. 7 shows a shorter lease time for randomized MAC clients 700.

In FIG. 7, a DHCP server 710 is shown providing DHCP IP address allocation 712 for a MAC randomized enabled client 714 and DHCP IP address allocation 740 for a MAC randomized disabled client 742. An IP address table 716 shows Host Names 720, Randomized MAC addresses 722, IP address assignments 724, assignment status 726, and Lease Time 728.

IP address table 716 shows entries for a client device that has Host Name 720 of Redmi 730. IP address table 716 shows Randomized MAC addresses 722 for each entry in the IP address table 716. In FIG. 7, the IP address table 716 shows the use of a first set of IP address assignments 732 for the first four entries 734 in IP address table 716. The same first set of IP address assignments 732 are also used for the next four entries 736 in IP address table 716. In the next two entries 738, the first two IP address assignments 770 from the same first set of IP address assignments 732 are used. In IP address table 716, the Lease Time 728 is 10 minutes 772 rather than 24 hours as shown in FIGS. 5-6. In FIG. 7, only the last entry 774 has an IP address status of ON 776 to reflect IP address 192.168.254.23 778 is assigned.

The table for the MAC Randomization Disabled Client 542 is the same as shown with reference to FIGS. 5-6. The Host Name is show as Motorola 750. The MAC address 752 is not randomized as demonstrated by the second bit not having a value of 2, 6, A, or E. An IP address of 192.168.254.46 754 is assigned to the Motorola host 750. The status 756 is ON and the Least Time 758 is 24 hours.

Figure 8:
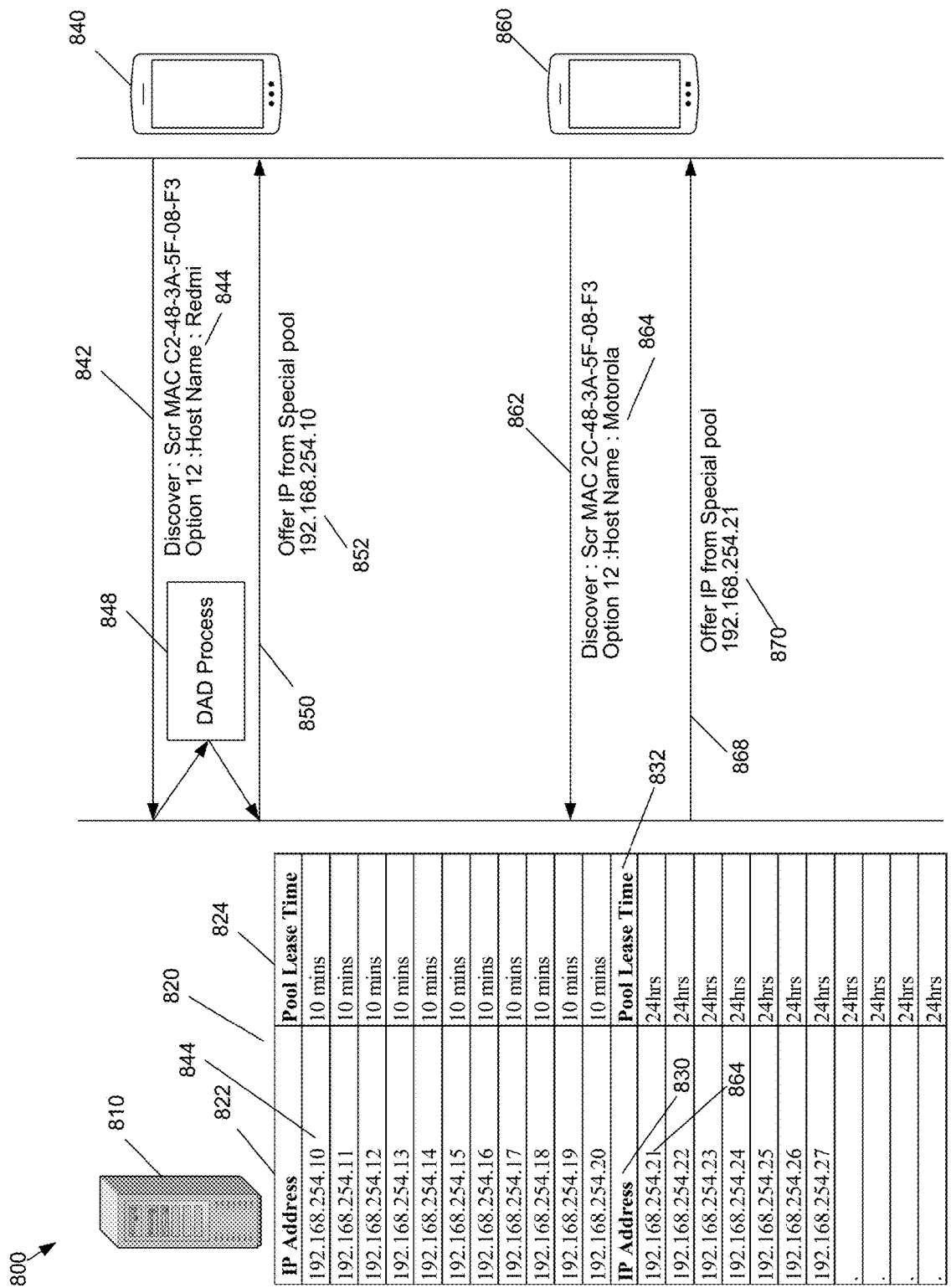
FIG. 8 shows IP address assignment with DAD processing for short lease durations.

FIG. 8 shows IP address assignment with DAD processing for short lease durations 800.

In FIG. 8, a DHCP Server 810 is shown for assigning IP addresses. An IP address table 820 is shown having IP addresses 822 and Pool Lease Times 824. The Pool Least Times 824 are 10 mins. A MAC randomized enabled client 840 sends a request 842 for IP address assignment to the DHCP Server 810. The DHCP Discover Message 842 includes the randomized MAC address and Option 12 information 844. The DHCP Server 810 identifies IP address 192.168.254.10 844 from the IP address pool 822. The DHCP Server 810 performs duplicate address detection (DAD) processing 848 on IP address 192.168.254.10 844. When DHCP Server 810 determines from the DAD processing 848 that IP address 192.168.254.10 844 is not in use, DHCP Server 810 provides IP address 192.168.254.10 852 having a Pool Lease Time 824 of 10 mins in DHCP Offer Message 850.

MAC Randomization Disabled Client 860 sends a request 862 for IP address assignment to the DHCP Server 810. The DHCP Discover Message 842 includes the non-randomized MAC address and Option 12 information 864. The DHCP Server 810 identifies IP address 192.168.254.21 864 from the IP address pool 830. DHCP Server 810 provides IP address 192.168.254.21 870 in DHCP Offer Message 868. DHCP Request and Acknowledgement messages are not shown in FIG. 8. However, DHCP REQUEST and ACK packets will complete the transactions that result in successful IP assignments.

Figure 9:
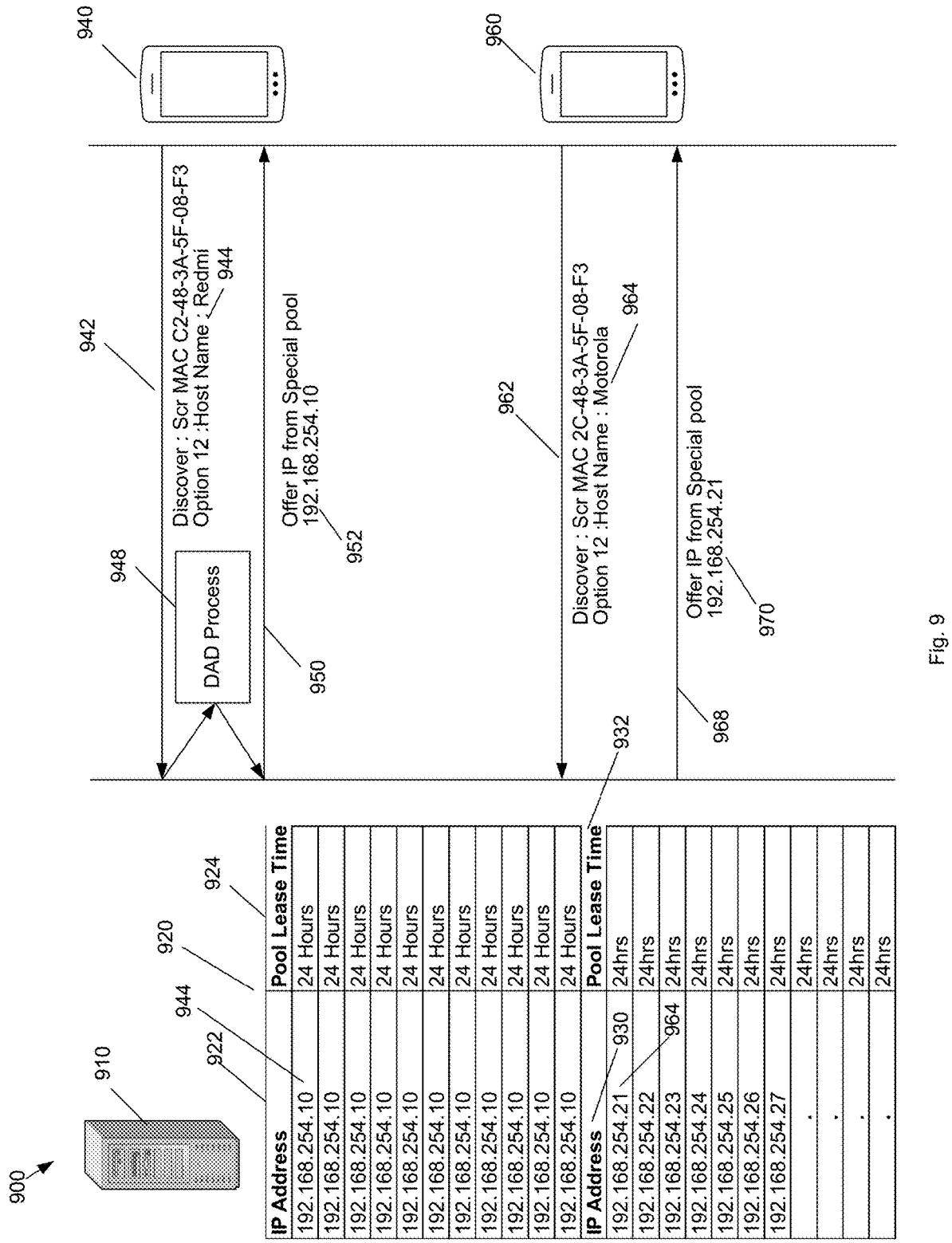
FIG. 9 shows IP address assignment with DAD processing for clients having the same IP address.

FIG. 9 shows IP address assignment with DAD processing for clients having the same IP address 900.

In FIG. 9, a DHCP Server 910 is shown for assigning IP addresses. An IP address table 920 is shown having IP addresses 922 and Pool Lease Times 924. The Pool Least Times 924 are 24 hours. A MAC randomized enabled client 940 sends a request 942 for IP address assignment to the DHCP Server 910. The DHCP Discover Message 942 includes the randomized MAC address and Option 12 information 944. The DHCP Server 910 identifies IP address 192.168.254.10 944 from the IP address pool 922. The DHCP Server 810 performs duplicate address detection (DAD) processing 948 on IP address 192.168.254.10 944. When DHCP Server 910 determines from the DAD processing 948 that IP address 192.168.254.10 944 is not in use, DHCP Server 910 assigns IP address 192.168.254.10 952 having a Pool Lease Time 924 of 24 hours to the client in DHCP Offer Message 950.

MAC Randomization Disabled Client 960 sends a request 962 for IP address assignment to the DHCP Server 910. The DHCP Discover Message 942 includes the non-randomized MAC address and Option 12 information 964. The DHCP Server 910 identifies IP address 192.168.254.21 964 from the IP address pool 930. DHCP Server 910 provides IP address 192.168.254.21 970 in DHCP Offer Message 968. DHCP Request and Acknowledgement messages are not shown in FIG. 9. However, DHCP REQUEST and ACK packets will complete the transactions that result in successful IP assignments.

FIG. 10 shows a DHCP Server Lease Table 1000 having duplicate host names.

In FIG. 10, a first entry 1010 in DHCP Server Lease Table 1000 has a host name of LP-DDEVERAJ 1012. A second entry 1020 in DHCP Server Lease Table 1000 also has a host name of LP-DDEVERAJ 1022.

The first entry 1010 has IP Address 1030 of 192.168.0.6 1032, a MAC address 1040 of dc:1b:a1:72:7e:b9 1042. The state 1050 of the first entry 1010 is Active 1052. The Expiration 1060 of the first entry 1010 is 00:23:53:52 1062.

The second entry 1020 has IP Address 1030 of 192.168.0.7 1034, a MAC address 1040 of 34:f3:9a:56:e5:5f 1044. The state 1050 of the second entry 1020 is Active 1054. The Expiration 1060 of the second entry 1020 is 00:23:46:29 1064.

A DAD process is performed on IP Address 1030 of 192.168.0.6 1032 of the first entry 1010. If the DAD process fails, a second DAD processing attempt is performed for IP Address 1030 of 192.168.0.7 1034 of the second entry 1020. If the second DAD processing attempt fails, DAD processing is performed for IP address 192.168.0.8. The DAD processing for IP address 192.168.0.8 will pass because IP address 192.168.0.8 is not listed in the server lease table.

Figure 11:
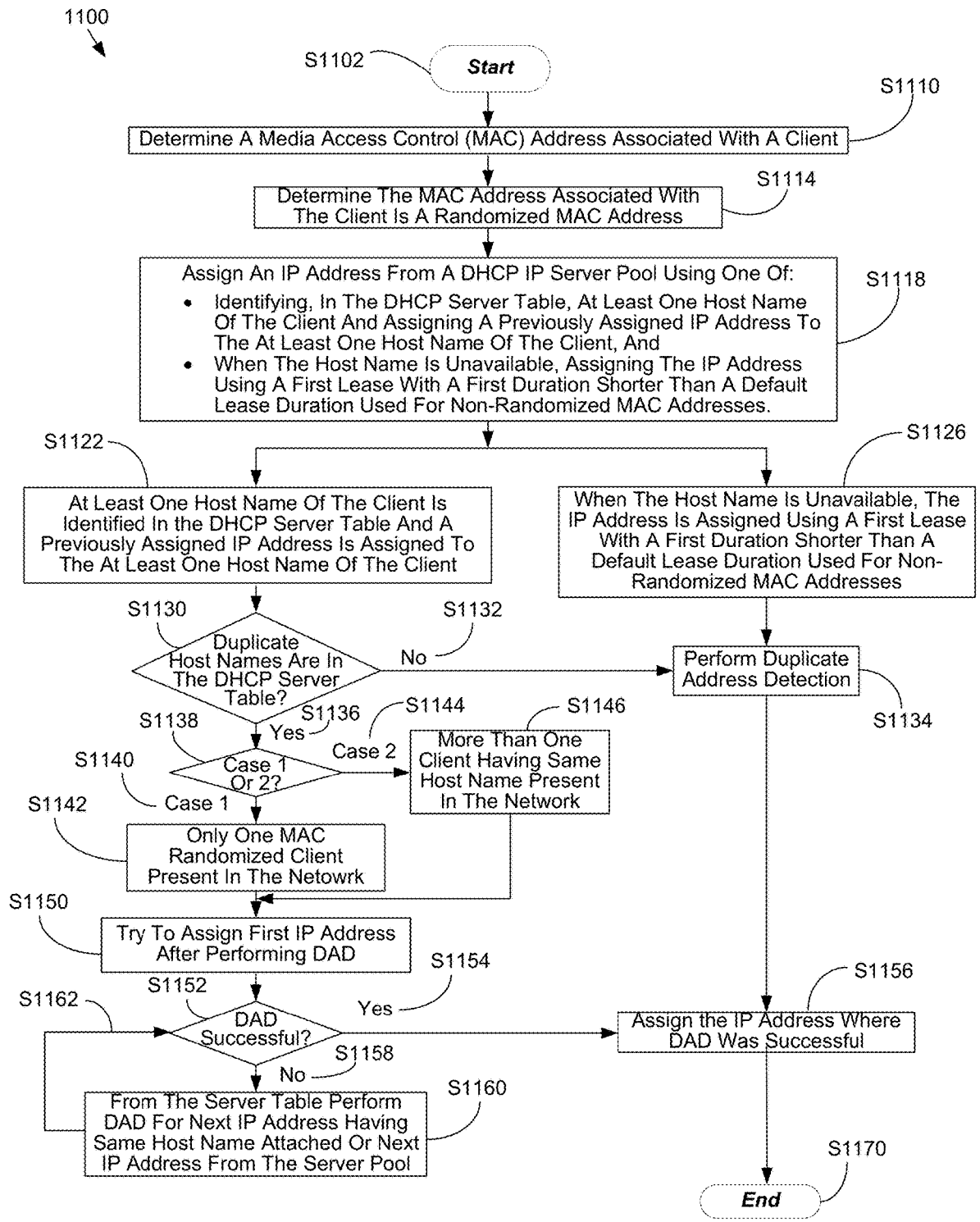
FIG. 11 is a flow chart of a method for improving the assignment of an IP address to a client when the client has a randomized MAC address.

FIG. 11 is a flow chart of a method 1100 for improving the assignment of an IP address to a client when the client has a randomized MAC address.

In FIG. 11, method 1100 starts (S1102), and a Media Access Control (MAC) address associated with a client is determined (S1110). Referring to FIG. 2, field 210 shows that the MAC address is determined. MAC address is 6 bytes or 48 bits, i.e., xx:xx:xx:xx:xx:xx.

The MAC address associated with the client is determined to be a randomized mac address (S1114). Referring to FIG. 2, The second filed 220 shows that the network device analyzes the second character in the 48 bit MAC address to determine whether MAC address randomized. The third field 230 shows that the MAC address is determined to be randomized when the second bit has a value of 2, 6, A, or E. The fourth field 240 shows a MAC address where the second bit has a value of 2, which signifies that the MAC address is a randomized MAC address.

An IP address from a DHCP IP Server Pool is assigned to the client using one of identifying, in the DHCP server table, at least one host name of the client and assigning a previously assigned IP address to the at least one host name of the client, and, when the host name is unavailable, assigning the IP address using a first lease with a first duration shorter than a default lease duration used for non-randomized MAC addresses (S1118). Referring to FIG. 6, the IP address table 616 shows the same IP address assignments 630 for each entry. The Lease Time 628 for each entry is 24 hours and only the last entry 632 has an IP address status of ON 634 to reflect IP address 192.168.254.31 636 is assigned.

When the host name is unavailable, the IP address is assigned using a first lease with a duration shorter than a default lease duration used for non-randomized MAC addresses (S1126). Referring to FIG. 7, in IP address table 716, the Lease Time 728 is 10 minutes 772 rather than 24 hours.

Duplicate address detection is then performed (S1134). When the duplicate address detection is successful, the IP address is assigned (S1156). Referring to FIG. 8, the DHCP Server 810 performs duplicate address detection (DAD) processing 848 on IP address 192.168.254.10 844. When DHCP Server 810 determines from the DAD processing 848 that IP address 192.168.254.10 844 is not in use, DHCP Server 810 provides IP address 192.168.254.10 852 having a Pool Lease Time 824 of 10 mins in DHCP Offer Message 850.

When at least one host name of the client is identified in the DHCP server table and a previously assigned IP address is assigned to the at least one host name of the client (S1122), a determination is made whether there are duplicate host names in the DHC server table (S1130). Referring to FIG. 6, the IP address table 616 shows duplicate IP address assignments 630 for each entry.

If no (S1132), duplicate address detection is performed (S1134). When the duplicate address detection is successful, the IP address is assigned (S1156). Referring to FIG. 8 the DHCP Server 810 performs duplicate address detection (DAD) processing 848 on IP address 192.168.254.10 844. When DHCP Server 810 determines from the DAD processing 848 that IP address 192.168.254.10 844 is not in use, DHCP Server 810 provides IP address 192.168.254.10 852 having a Pool Lease Time 824 of 10 mins in DHCP Offer Message 850.

If it is determined that there are duplicate host names in the DHCP server table (S1136), a determination is made whether a first case of a second case exists (S1138). If case 2 exists, more than one client has the same host name in the network (S1146) and an attempt is made to assign the first IP address after performing DAD (S1150). Referring to FIG. 10, The first entry 1010 has IP Address 1030 of 192.168.0.6 1032, a MAC address 1040 of dc:1b:a1:72:7e:b9 1042. The state 1050 of the first entry 1010 is Active 1052. The Expiration 1060 of the first entry 1010 is 00:23:53:52 1062. The second entry 1020 has IP Address 1030 of 192.168.0.7 1034, a MAC address 1040 of 34:f3:9a:56:e5:5f 1044. The state 1050 of the second entry 1020 is Active 1054. The Expiration 1060 of the second entry 1020 is 00:23:46:29 1064. A DAD process is performed on IP Address 1030 of 192.168.0.6 1032 of the first entry 1010. If the DAD process fails, a second DAD processing attempt is performed for IP Address 1030 of 192.168.0.7 1034 of the second entry 1020. If the second DAD processing attempt fails, DAD processing is performed for IP address 192.168.0.8. The DAD processing for IP address 192.168.0.8 will pass because IP address 192.168.0.8 is not listed in the server lease table.

If case 1 exists, only one MAC randomized client is present in the network (S1142) and an attempt is made to assign the first IP address after performing DAD (S1150). Referring to FIG. 8, the DHCP Server 810 identifies IP address 192.168.254.10 844 from the IP address pool 822. The DHCP Server 810 performs duplicate address detection (DAD) processing 848 on IP address 192.168.254.10 844.

A determination is made whether the DAD process was successful (S1152). Referring to FIG. 8, when DHCP Server 810 determines from the DAD processing 848 that IP address 192.168.254.10 844 is not in use, DHCP Server 810 provides IP address 192.168.254.10 852 having a Pool Lease Time 824 of 10 mins in DHCP Offer Message 850.

If the DAD process is not successful (S1158), DAD is performed for the next IP address having the same host name attached, or, when no duplicate host name passes the DAD process, a next IP address is selected from the server pool (S1160. DAD is repeated (S1162) until an IP address passes the DAD processes (S1154). Referring to FIG. 10, a DAD process is performed on IP Address 1030 of 192.168.0.6 1032 of the first entry 1010. If the DAD process fails, a second DAD processing attempt is performed for IP Address 1030 of 192.168.0.7 1034 of the second entry 1020. If the second DAD processing attempt fails, DAD processing is performed for IP address 192.168.0.8. The DAD processing for IP address 192.168.0.8 will pass because IP address 192.168.0.8 is not listed in the server lease table.

Then, the IP address the successfully passed the DAD process is assigned to the client (S1156). Referring to FIG. 9, when DHCP Server 910 determines from the DAD processing 948 that IP address 192.168.254.10 944 is not in use, DHCP Server 910 assigns IP address 192.168.254.10 952 having a Pool Lease Time 924 of 24 hours to the client in DHCP Offer Message 950.

The method then ends (S1170).

Figure 12:
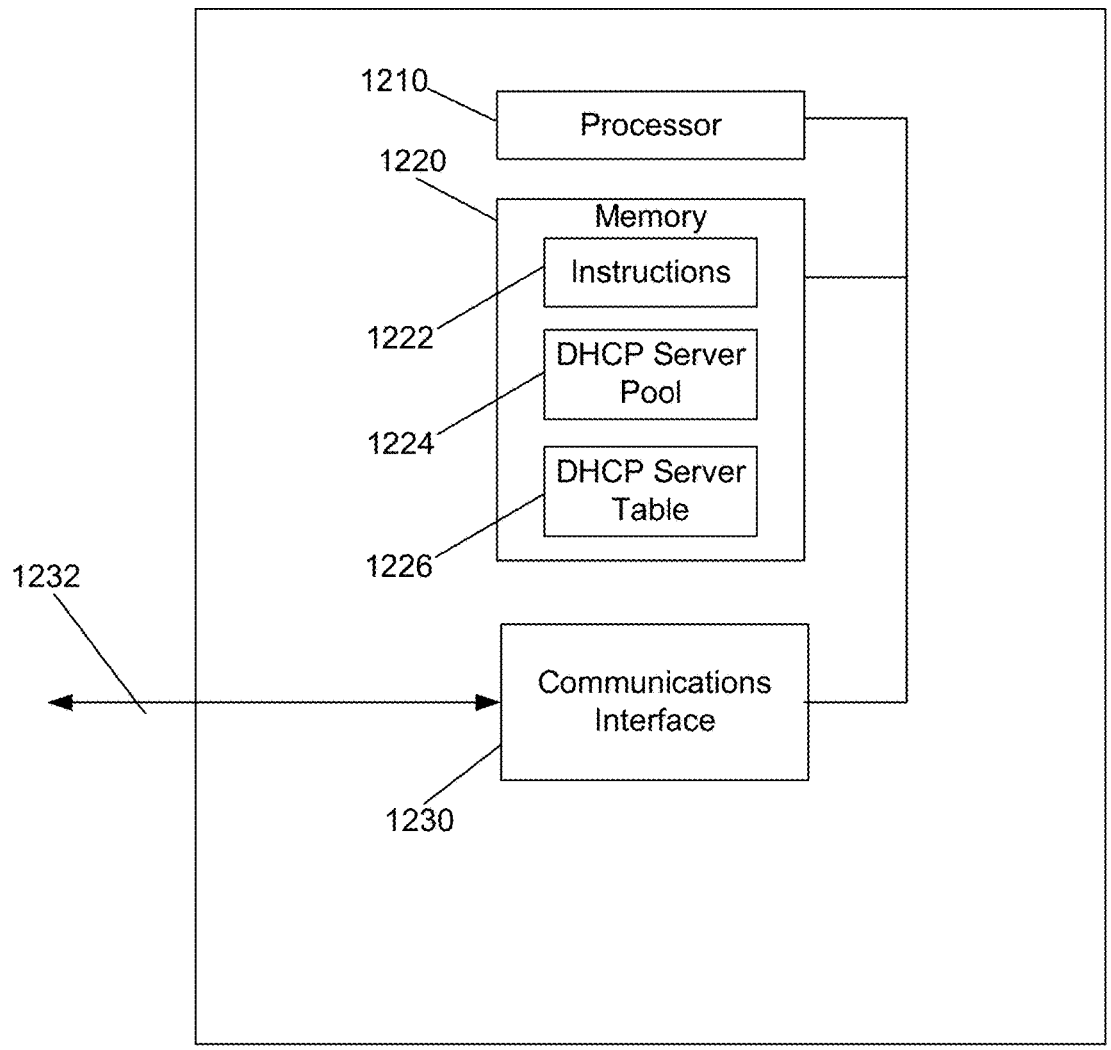
FIG. 12 illustrates a block diagram of a DHCP Server.

FIG. 12 illustrates a block diagram of a DHCP server 1200.

In FIG. 12, network device 1200 includes a processor 1210, memory 1220, and communication interface 1230. Memory 1220 may include instructions 1222 and data for a DHCP server pool 1224. Communication interface 1230 processes data and packets for transmission as well as processing packets that are received by the device 800 via communication channel 1232. In device 1200, processor 1210 may execute the instructions 1222 in memory 1220 to determine a media access control (MAC) address associated with a client, and determine the MAC address associated with the client is a randomized MAC address. Processor 1210 assigns an IP address the client from a DHCP IP server pool 1224 using one of identifying, in a DHCP server table 1226, at least one host name of the client and assigning a previously assigned IP address to the at least one host name of the client, and, when the host name of the client is not available, assigning the IP address using a first lease with a first duration shorter than a default lease duration used for non-randomized MAC addresses.

The processor 1210 identifies the at least one host name of the client by determining the at least one host name from a DHCP discover message with Option 12 specifying the at least one host name, and identifies the at least one host name in the DHCP server table 1226 based on the at least one host name specified by the DHCP discover message with Option 12, wherein the processor 1210 determines the MAC address the randomized MAC address by determining a second bit in the MAC address has a predetermine indicator for randomized MAC addresses, wherein the predetermined indicator for the randomized MAC addresses comprises one of a value of 2, 6, A, and E.

When the processor 1210 assigns the IP address using the first lease, the processor 1210 performs duplicate address detection (DAD) to ensure the IP address is not currently in use.

When the processor 1210 identifies the at least one host name of the client is in the DHCP server table 1226 and the previously assigned IP address is assigned to the at least one host name of the client, the processor 1210 determines whether duplicate host names are in the DHCP server table 1226, the processor 1210 performing duplicate address detection (DAD) to ensure the previously assigned IP address is not currently in use when the processor 1210 determines there are no duplicate host names in the DHCP server table 1226.

The processor 1210 selects from the DHCP server pool 1224 a first fixed IP address for the host name of the client when the processor 1210 determines there are duplicate host names in the DHCP server table 1226, performs duplicate address detection (DAD) to determine whether the first fixed IP address is in use, and assigns the first fixed IP address to the host name when the processor 1210 determines from the duplicate address detection (DAD) that the first fixed IP address is not in use.

The processor 1210 selects from the DHCP server table 1226 a next fixed IP address having the same host name when the first fixed IP address is determined to be in use, and performs duplicate address detection (DAD) to determine whether the next fixed IP address having the same host name is in use, the processor 1210 assigning the next fixed IP address having the same host name to the client when the processor 1210 determines from the duplicate address detection (DAD) that the next fixed IP address having the same host name is not in use.

The processor 1210 selects from the DHCP server table 1226 a different fixed IP address from the DHCP server pool 1224 for the client associated with the host name when the next fixed IP address having the same host name is determined to be in use and performs duplicate address detection (DAD) to determine whether the different fixed IP address is currently in use, the processor 1210 assigning the different fixed IP address to the client associated with the host name when the processor 1210 determines from the duplicate address detection (DAD) that the different fixed IP address is not currently in use.

The subject matter of the present disclosure may be provided as a computer program product including one or more non-transitory computer-readable storage media having stored thereon instructions (in compressed or uncompressed form) that may be used to program a computer (or other electronic device) to perform processes or methods described herein. The computer-readable storage media may include one or more of an electronic storage medium, a magnetic storage medium, an optical storage medium, a quantum storage medium, or the like. For example, the computer-readable storage media may include, but are not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions.

Further, the subject matter of the present disclosure may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program may be configured to access, including signals transferred by one or more networks. For example, a transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case. A variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A Dynamic Host Configuration Protocol (DHCP) server, comprising:
   a memory storing computer-readable instructions; and
   a processor configured to execute the computer-readable instructions to:
      determine a media access control (MAC) address associated with a client;
      determine the MAC address associated with the client is a randomized MAC address; and
      assign an IP address the client from a DHCP IP server pool using one of:
         identifying, in a DHCP server table, at least one host name of the client and assigning a previously assigned IP address to the at least one host name of the client; and
         when the host name of the client is not available, assigning the IP address using a first lease with a first duration shorter than a default lease duration used for non-randomized MAC addresses.

2. The DHCP server of claim 1, wherein the processor identifies the at least one host name of the client by determining the at least one host name from a DHCP discover message with Option 12 specifying the at least one host name, and identifies the at least one host name in the DHCP server table based on the at least one host name specified by the DHCP discover message with Option 12, wherein the processor determines the MAC address the randomized MAC address by determining a second bit in the MAC address has a predetermine indicator for randomized MAC addresses, wherein the predetermined indicator for the randomized MAC addresses comprises one of a value of 2, 6, A, and E.

3. The DHCP server of claim 1, wherein, when the processor assigns the IP address using the first lease, the processor performing duplicate address detection (DAD) to ensure the IP address is not currently in use.

4. The DHCP server of claim 1, wherein, when the processor identifies the at least one host name of the client is in the DHCP server table and the previously assigned IP address is assigned to the at least one host name of the client, the processor determines whether duplicate host names are in the DHCP server table, the processor performing duplicate address detection (DAD) to ensure the previously assigned IP address is not currently in use when the processor determines there are no duplicate host names in the DHCP server table.

5. The DHCP server of claim 4, wherein the processor selects from the DHCP server pool a first fixed IP address for the host name of the client when the processor determines there are duplicate host names in the DHCP server table, performs duplicate address detection (DAD) to determine whether the first fixed IP address is in use, and assigns the first fixed IP address to the host name when the processor determines from the duplicate address detection (DAD) that the first fixed IP address is not in use.

6. The DHCP server of claim 5, wherein the processor selects from the DHCP server table a next fixed IP address having the same host name when the first fixed IP address is determined to be in use, and performs duplicate address detection (DAD) to determine whether the next fixed IP address having the same host name is in use, the processor assigning the next fixed IP address having the same host name to the client when the processor determines from the duplicate address detection (DAD) that the next fixed IP address having the same host name is not in use.

7. The DHCP server of claim 6, wherein the processor selects from the DHCP server table a different fixed IP address from the DHCP server pool for the client associated with the host name when the next fixed IP address having the same host name is determined to be in use and performs duplicate address detection (DAD) to determine whether the different fixed IP address is currently in use, the processor assigning the different fixed IP address to the client associated with the host name when the processor determines from the duplicate address detection (DAD) that the different fixed IP address is not currently in use.

8. A method for assigning Internet Protocol (IP) addresses for clients having media access control (MAC) address randomization enabled comprising:
  determining a media access control (MAC) address associated with a client;
  determining the MAC address associated with the client is a randomized MAC address; and
  assigning an IP address to the client from a DHCP IP server pool, wherein the assigning the IP address further comprises one of:
    identifying, in a DHCP server table, at least one host name of the client and assigning a previously assigned IP address to the at least one host name of the client; and
    when the host name of the client is not available, assigning the IP address using a first lease with a first duration shorter than a default lease duration used for non-randomized MAC addresses.

9. The method of claim 8, wherein the identifying the at least one host name of the client further comprises determining the at least one host name from a DHCP discover message with Option 12 specifying the at least one host name, and identifying the at least one host name in the DHCP server table based on the at least one host name specified by the DHCP discover message with Option 12.

10. The method of claim 8 further comprising performing duplicate address detection (DAD) to ensure the IP address is not currently in use when the IP address is assigned using the first lease.

11. The method of claim 8, wherein the identifying the at least one host name of the client is in the DHCP server table further comprises determining whether duplicate host names are in the DHCP server table, and the assigning the previously assigned IP address to the at least one host name of the client further comprises performing duplicate address detection (DAD) to ensure the previously assigned IP address is not currently in use when no duplicate host names are determined to be in the DHCP server table.

12. The method of claim 11, wherein the determining whether duplicate host names are in the DHCP server table comprises determining there are duplicate host names in the DHCP server table, and wherein the assigning the previously assigned IP address to the at least one host name of the client further comprises selecting from the DHCP server pool a first fixed IP address for the host name of the client when there are duplicate host names in the DHCP server table, performing duplicate address detection (DAD) to determine whether the first fixed IP address is in use, and assigning the first fixed IP address to the host name when the duplicate address detection (DAD) determines that the first fixed IP address is not in use.

13. The method of claim 12 further comprising selecting from the DHCP server table a next fixed IP address having the same host name when the first fixed IP address is determined to be in use, performing duplicate address detection (DAD) to determine whether the next fixed IP address having the same host name is in use, and assigning the next fixed IP address having the same host name to the client when the next fixed IP address having the same host name is determined to not currently be in use.

14. The method of claim 13 further comprising selecting from the DHCP server table a different fixed IP address from the DHCP server pool for the client associated with the host name when the next fixed IP address having the same host name is determined to be in use, performing duplicate address detection (DAD) to determine whether the different fixed IP address is currently in use, and assigning the different fixed IP address to the client associated with the host name when the different fixed IP address is determined to not currently be in use.

15. A non-transitory computer-readable media having computer-readable instructions stored thereon, which when executed by a processor causes the processor to perform operations comprising:
  determining a media access control (MAC) address associated with a client;
  determining the MAC address associated with the client is a randomized MAC address; and
  assigning an IP address to the client from a DHCP IP server pool, wherein the assigning the IP address further comprises one of:
    identifying, in a DHCP server table, at least one host name of the client and assigning a previously assigned IP address to the at least one host name of the client; and
    when the host name of the client is not available, assigning the IP address using a first lease with a first duration shorter than a default lease duration used for non-randomized MAC addresses.

16. The non-transitory computer-readable media of claim 15 further comprising performing duplicate address detection (DAD) to ensure the IP address is not currently in use when the IP address is assigned using the first lease.

17. The non-transitory computer-readable media of claim 15, wherein the identifying the at least one host name of the client is in the DHCP server table further comprises determining whether duplicate host names are in the DHCP server table, and the assigning the previously assigned IP address to the at least one host name of the client further comprises performing duplicate address detection (DAD) to ensure the previously assigned IP address is not currently in use when no duplicate host names are determined to not be in the DHCP server table.

18. The non-transitory computer-readable media of claim 17, wherein the determining whether duplicate host names are in the DHCP server table comprises determining there are duplicate host names in the DHCP server table, and wherein the assigning the previously assigned IP address to the at least one host name of the client further comprises selecting from the DHCP server pool a first fixed IP address for the host name of the client when there are duplicate host names in the DHCP server table, performing duplicate address detection (DAD) to determine whether the first fixed IP address is in use, and assigning the first fixed IP address to the host name when the duplicate address detection (DAD) determines that the first fixed IP address is not in use.

19. The non-transitory computer-readable media of claim 18 further comprising selecting from the DHCP server table a next fixed IP address having the same host name when the first fixed IP address is determined to be in use, performing duplicate address detection (DAD) to determine whether the next fixed IP address having the same host name is in use, and assigning the next fixed IP address having the same host name to the client when the next fixed IP address having the same host name is determined to not currently be in use.

20. The non-transitory computer-readable media of claim 19 further comprising selecting from the DHCP server table a different fixed IP address from the DHCP server pool for the client associated with the host name when the next fixed IP address having the same host name is determined to be in use, performing duplicate address detection (DAD) to determine whether the different fixed IP address is currently in use, and assigning the different fixed IP address to the client associated with the host name when the different fixed IP address is determined to not currently be in use.

* * * * *